Figure 1:
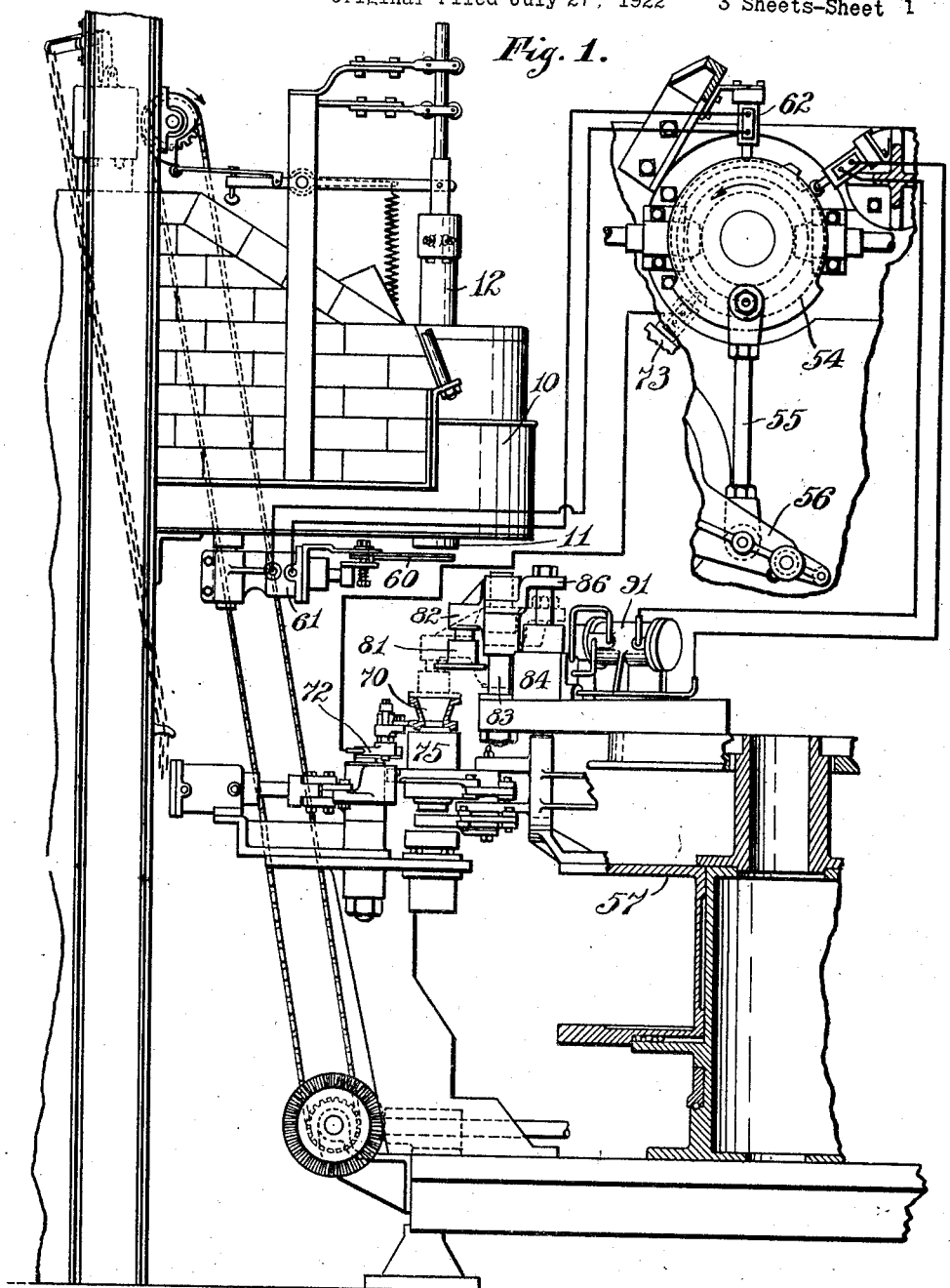

March 8, 1927.

A. SAMUELSON 1,620,292

GLASS WORKING MACHINE

Original Filed July 27, 1922   3 Sheets-Sheet 1

INVENTOR
Alexander Samuelson,
BY
Arthur M. Hood.
ATTORNEY

March 8, 1927. 1,620,292
A. SAMUELSON
GLASS WORKING MACHINE
Original Filed July 27, 1922 3 Sheets-Sheet 2
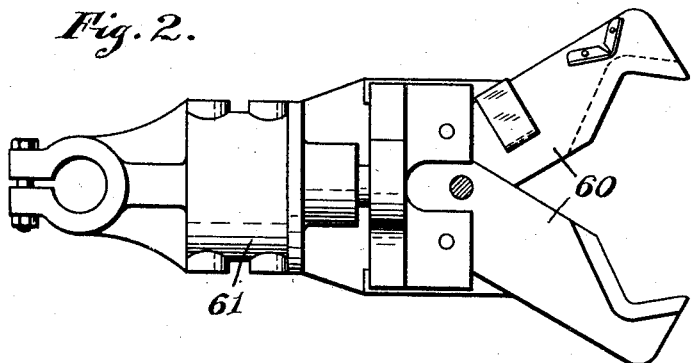
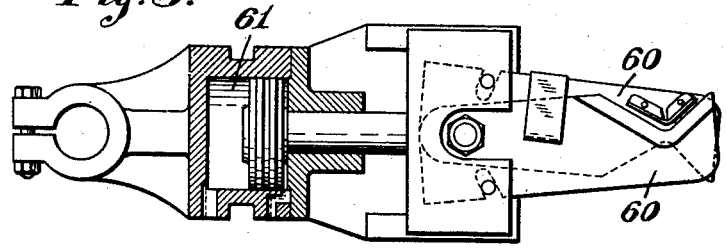
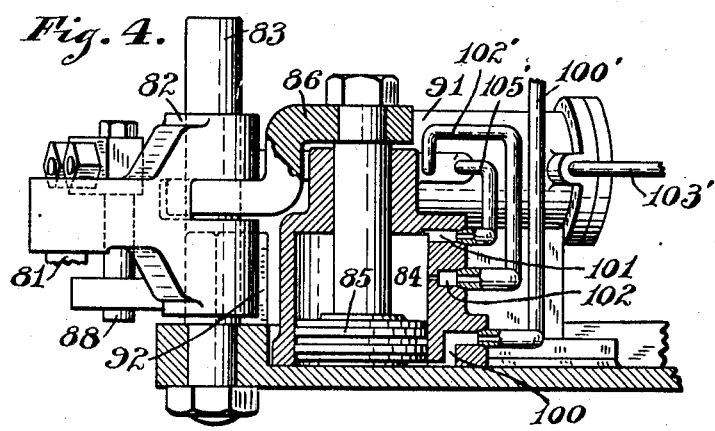
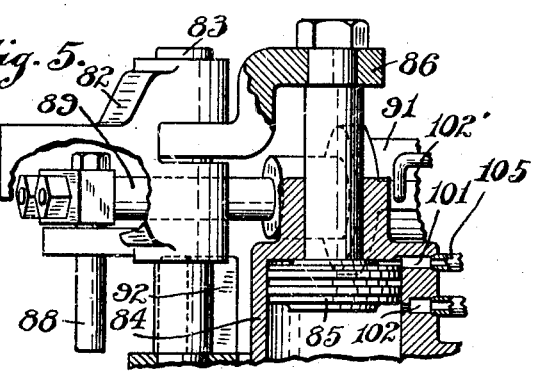
INVENTOR
Alexander Samuelson,
BY
Arthur M. Hood
ATTORNEY March 8, 1927.
A. SAMUELSON
1,620,292
GLASS WORKING MACHINE
Original Filed July 27, 1922   3 Sheets-Sheet 3
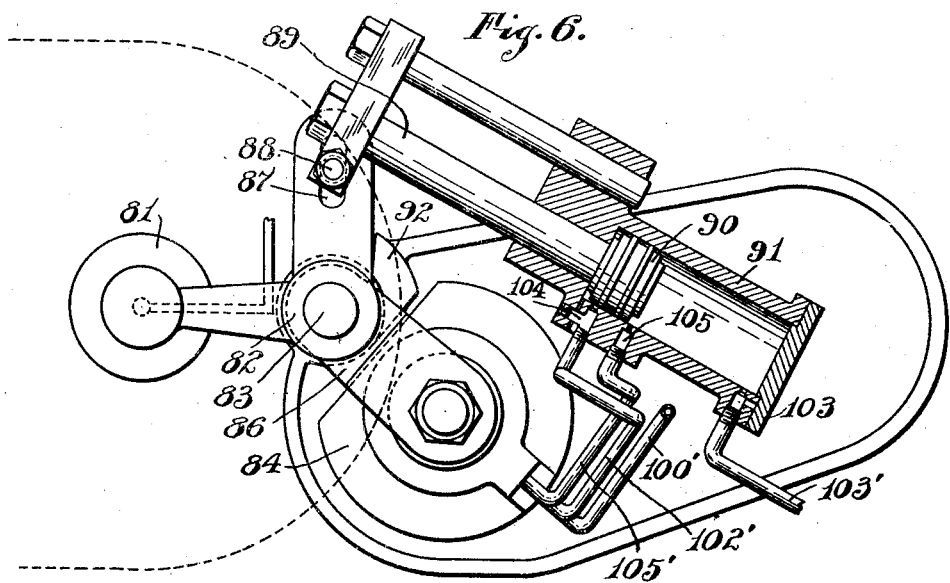
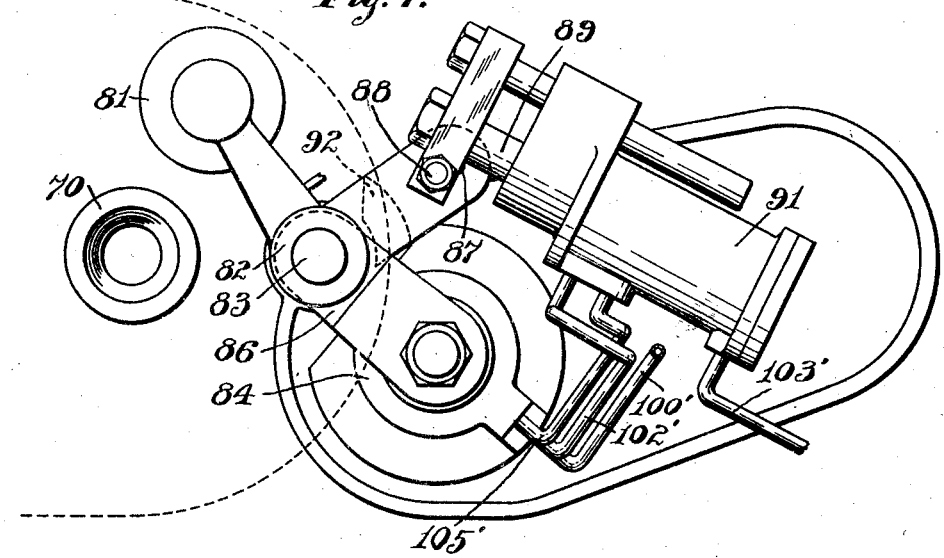
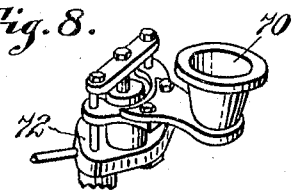
INVENTOR
Alexander Samuelson,
BY
Arthur M. Hood.
ATTORNEY Patented Mar. 8, 1927.

1,620,292

UNITED STATES PATENT OFFICE.

ALEXANDER SAMUELSON, OF TERRE HAUTE, INDIANA, ASSIGNOR TO CHAPMAN J. ROOT, OF TERRE HAUTE, INDIANA.

GLASS-WORKING MACHINE.

Original application filed July 27, 1922, Serial No. 577,792. Divided and this application filed January 9, 1924. Serial No. 685,151.

The object of my invention is to provide an improved machine for glass working, more particularly designed for the commercial production of narrow-neck bottles, although not necessarily limited to such use.

This application is a division from my pending application Serial Number 577,792.

The accompanying drawings illustrate my invention. Fig. 1 is a general view in partial vertical section, and partially diagrammatic, of my improved apparatus; Fig. 2 a plan of a satisfactory form of shearing mechanism; Fig. 3 a partial horizontal section of the shears; Fig. 4 a partial vertical section of the compacting head mechanism; Fig. 5 a fragmentary vertical section of some of the parts shown in Fig. 4 in another position; Fig. 6 a plan in partial horizontal section of the compacting head mechanism in compacting position; Fig. 7 a plan of the parts shown in Fig. 6 in withdrawn position; and Fig. 8 a fragmentary detail of the funnel and its carrier.

In the drawings, 10 indicates the delivery spout of a glass furnace having a downwardly directed delivery orifice 11 through which a stream of glass is delivered, being controlled conveniently by means of a vertically reciprocating plunger 12. Located in a horizontal plane slightly below the lower end of discharge orifice 11 is a pair of cutting blades 60 which may be of any desirable and well-known type, although I prefer that they be of such character as to move toward each other so as to complete their cutting function substantially at the axis of a column of glass issuing from the discharge orifice. In the present drawings, these shears are shown as being manipulated by means of a pneumatic motor 61, the action of which is controlled by a controlling valve 62 operated by a timing element 54 which is constantly driven and serves, through a pitman 55, to reciprocate a table-driving element 56 of well-known form to advance a mold-carrying table 57 step-by-step. The details of these mechanisms form no part of my present invention, and may be of any well-known and desired form.

Located in line below the orifice 11 is a funnel 70, vertically reciprocable by means of a cylinder and piston structure 72 of common type and connected by suitable piping with a control valve 73 arranged within the influence of timer 54, the arrangement being such that the funnel will be intermittently raised and lowered so as to co-operate with successive plain molds 75 brought successively into filling position by advancement of the mold-carrying table 57.

The precise details of the mold-carrying table 76 and the mold 75 are wholly immaterial so far as the present invention is concerned. Any of the well-known types of machines embodying a movable carrier for a series of molds to be carried through a successive series of positions for filling, forming, etc., may be utilized.

In order that the fresh charge of glass may be compacted into the lower portion of the mold (the neck portion of the mold in a narrow neck bottle machine), I have considered it advisable to provide a construction by means of which the compacting may be accomplished as quickly as possible after the charge of glass has been dropped into the mold, and consequently I have provided a compacting blow head 81 arranged to operate at the filling station, thus eliminating the period which is commonly required for shifting the freshly charged molds from filling position to a compacting position. Head 81 is shown as of a common type wherein a vertically sliding lower portion acts as a valve to control air flow.

When the compacting head 81 is arranged at the filling station it is of course necessary to withdraw this head for the filling operation. Head 81 is, therefore, carried at the end of one arm of a bell-crank 82 pivoted and vertically slidable upon a pin 83. Located alongside of pin 83 is a cylinder 84 provided with a piston 85 to the upper end of the rod of which is attached a finger 86 which is slidably mounted on pin 83 and interdigitated with lever 82. The bell crank 82 has one of its arms slotted at 87 to receive a pin 88 carried by rod 89 of piston 90 which is mounted in the cylinder 91.

Pin 88 is arranged vertically and has sufficient length to permit a vertical movement of the lever 82 and said lever slides alongside a post 92 which is of such height that, when lever 82 is raised to its highest position, so as to lift head 81 from contact with the upper end of funnel 70, lever 82 may be swung upon 83 so as to bring one of its arms over the top of post 92 and thus prevent accidental dropping of the head 81.

The movements of pistons 85 and 90 must be properly co-ordinated and for that purpose cylinder 84 is provided with a bottom port 100, top port 101 and intermediate port 102 which is so located as to be uncovered by piston 85 when said piston reaches its upper position.

Similarly cylinder 91 is provided with end ports 103 and 104 and an intermediate port 105 which is uncovered when piston 90 has been driven to its final position to bring head 81 to glass-compacting position.

Ports 103 and 100 are connected by suitable pipes 103' and 100', respectively, with a control valve 106 arranged within the influence of the timer 54. Ports 105 and 101 are connected by a pipe 105' and ports 102 and 104 are connected by a pipe 102' the arrangement being such that when air is admitted through port 103, piston 90 will be driven to the position shown in Fig. 6 and thereupon air may flow from port 105 through pipe 105' to port 101 and thus drive piston 85 to a position shown in Fig. 4 whereupon air may pass through port 102 and pipe 102' to port 104. In the meantime, however, the air supply from valve 106 to port 103 has been cut off and there is therefore no return movement of piston 90. In due course, however, valve 106 will be operated so as to permit flow of air through pipe 100' to port 100 so that piston 85 will be driven to its upper position and, as it uncovers port 102, the air will flow through pipe 102' to port 104 and thus cause a return of piston 90 to the righthand end (Fig. 6) of cylinder 91.

The shear and plunger movements are so co-ordinated, in a well-known manner, preferably as set forth in my above-mentioned application, to deliver successive passages of molten glass to funnel 70 whereupon the funnel and compacting head, or blow-head, co-operate with the blank mold in the manner already described.

I claim as my invention:

1. In a glass working machine, the combination of a vertical support, a blow-head-support pivoted on said support and vertically movable thereon, a blow-head carried by said blow-head-support, a cylinder-and-piston unit connected to said blow-head-support, to produce vertical movement thereof, a cylinder-and-piston unit connected to said blow-head-support to produce swinging movement thereof, supply pipes leading to said two cylinder-and-piston units, means for controlling flow of motive fluid therethrough, and intermediate connections between the two cylinders and controlled by the relative movement of their pistons whereby successive lateral and vertical movements of the blow-head are obtained.

2. In a glass working machine, the combination of an element movable in two directions, a pair of cylinder-and-piston units connected to said element, each to cause movement of the element in one of its directions, means for controlling the flow of motive fluid from a source of supply directly to one end of each of said cylinder-piston units, and a pair of independent motive fluid connections, each between an intermediate point in one cylinder and the opposite end of the other cylinder, whereby relative movement between each piston and its cylinder will control flow of motive fluid to an end of the companion cylinder.

In witness whereof, I, Alexander Samuelson, have hereunto set my hand at Terre Haute, Indiana, this 5th day of January, A. D. one thousand nine hundred and twenty.

ALEXANDER SAMUELSON.